United States Patent
Kim

(10) Patent No.: US 10,001,842 B2
(45) Date of Patent: Jun. 19, 2018

(54) GESTURE RECOGNITION DEVICE

(71) Applicant: LG Innotek Co., Ltd., Seoul (KR)

(72) Inventor: Min Soo Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days. days.

(21) Appl. No.: 15/128,823

(22) PCT Filed: Mar. 19, 2015

(86) PCT No.: PCT/KR2015/002668
§ 371 (c)(1),
(2) Date: Sep. 23, 2016

(87) PCT Pub. No.: WO2015/147479
PCT Pub. Date: Oct. 1, 2015

(65) Prior Publication Data
US 2017/0108932 A1    Apr. 20, 2017

(30) Foreign Application Priority Data
Mar. 25, 2014  (KR) .................. 10-2014-0034615

(51) Int. Cl.
*G06F 3/01* (2006.01)
*G06F 3/03* (2006.01)

(52) U.S. Cl.
CPC ............ *G06F 3/017* (2013.01); *G06F 3/0325* (2013.01)

(58) Field of Classification Search
CPC ...... G06F 3/0325; G06F 3/0304; G06F 3/005; G06F 3/017
See application file for complete search history.

(56) References Cited

U.S. PATENT DOCUMENTS

2011/0199338 A1* 8/2011 Kim ...................... G06F 3/0418
                                                          345/175
2012/0312956 A1* 12/2012 Chang .................... G06F 3/017
                                                          250/201.1
2013/0182246 A1   7/2013 Tanase

FOREIGN PATENT DOCUMENTS

KR    20090107530 A    10/2009
WO    WO-2010030077 A2    3/2010
(Continued)

OTHER PUBLICATIONS

International Search Report in International Application No. PCT/KR2015/002668, filed Mar. 19, 2015.

*Primary Examiner* — Abhishek Sarma
(74) *Attorney, Agent, or Firm* — Saliwanchik, Lloyd & Eisenschenk

(57) ABSTRACT

The present invention provides a recognition device capable of recognizing a two-dimensional or three-dimensional gesture of a user by using a light receiving element. The device of one embodiment of the present invention comprises: a light receiving unit having a plurality of light receiving elements arranged therein; and a control unit for determining a direction in which a change in the amount of light of the plurality of light receiving elements is sensed by a gesture of a user. Since a gesture is capable of being recognized according to a direction of a light receiving element of which the amount of light is changed, price competitiveness for gesture recognition can be increased, and the device can be miniaturized so as to be arranged in a mobile terminal.

15 Claims, 3 Drawing Sheets

(56) References Cited

FOREIGN PATENT DOCUMENTS

WO     WO-2011155702 A2     12/2011
WO     WO-2013012130 A1     1/2013

\* cited by examiner

GESTURE RECOGNITION DEVICE

CROSS-REFERENCE TO RELATED APPLICATIONS

This application is the U.S. national stage application of International Patent Application No. PCT/KR2015/002668, filed Mar. 19, 2015, which claims priority to Korean Application No. 10-2014-0034615, filed Mar. 25, 2014, the disclosures of each of which are incorporated herein by reference in their entirety.

TECHNICAL FIELD

The teachings in accordance with the exemplary embodiments of this invention relate generally to a gesture recognition device.

BACKGROUND ART

Recently, technologies for recognizing a user's 3D (three dimensional) gesture and using the same have been developed in the fields of game consoles and televisions, and therefore, development related to the 3D gesture recognition devices has been accelerated. A 3D input device of the abovementioned type may be applicable to various applications by detection of depth information in addition to plane information of an image.

However, a conventional 3D gesture recognition device has a difficulty in miniaturization because it is sold as an external type or as a separate accessory type due to a module size thereof being too big. Meantime, concomitant with recent explosive growth of smart mobile terminals such as smart phones and smart pads, demand on 3D gesture recognition devices has expanded to mobile terminals. However, there is generated a disadvantage in mounting the 3D gesture recognition device on the mobile terminals due to difficulty in miniaturization as discussed above.

DISCLOSURE

Technical Problem

The present invention is provided to solve the abovementioned problems, and it is an object of the present invention to provide a gesture recognition device capable of recognizing a 2D (two dimensional) or 3D gesture of a user by using a light receiving elements.

Technical Solution

An object of the invention is to solve at least one or more of the above problems and/or disadvantages in a whole or in part and to provide at least the advantages described hereinafter. In order to achieve at least the above objects, in whole or in part, and in accordance with the purposes of the invention, as embodied and broadly described, and in one general aspect of the present invention, there is provided a gesture recognition device, the device comprising:

a light receiving unit arranged with a plurality of light receiving elements; and a control unit configured to determine a direction of a change in an amount of light which sensed by the plurality of light receiving elements, wherein the change is triggered by a gesture of user.

Preferably, but not necessarily, the light receiving unit may include first and second light receiving elements arranged to a first direction, and third and fourth light receiving elements arranged to a second direction.

Preferably, but not necessarily, the control unit may determine that a gesture input exists to the second direction when receiving from the first and second light receiving elements that there is a change in the light amount.

Preferably, but not necessarily, the control unit may determine that a gesture input exists to the second direction when receiving from the third and fourth light receiving elements that there is a change in the light amount.

Preferably, but not necessarily, the control unit may determine that a gesture input exists to a third direction when receiving from one or more of the first to fourth light receiving elements that the light amount is changed after maintaining for a predetermined time.

Preferably, but not necessarily, the gesture recognition device may further comprise a fifth light receiving element arranged at a predetermined position to sense changes in light amount after the light amount is maintained for a predetermined time.

Preferably, but not necessarily, the control unit may determine that a gesture input exists to the third direction when receiving from the fifth light receiving element that the light amount is changed after maintaining for a predetermined time.

Preferably, but not necessarily, the gesture recognition device may further comprise a light emitting unit arranged at a periphery of the light receiving unit to output a light.

In another general aspect of the present invention, there is provided a gesture recognition device, the device comprising: a light emitting unit to output a light; a light receiving unit including a plurality of light receiving elements arranged at a periphery of the light emitting unit; and a control unit configured to determine a direction of a change in an amount of light which sensed by the plurality of light receiving elements, wherein the change is triggered by a gesture of user and the plurality of light receiving elements is arranged in a grid pattern.

Preferably, but not necessarily, the control unit determines a direction of the gesture by detecting which light receiving element senses the sequentially changed light amount among the plurality of light receiving elements.

Preferably, but not necessarily, the light receiving unit may be configured such that a light receiving element is further arranged at a center of the grid pattern.

Preferably, but not necessarily, the control unit may determine that a 3D gesture input exists when receiving that light amount is changed after light amount of the light receiving element arranged in the center is maintained for a predetermined time.

Advantageous Effects

Since a gesture is capable of being recognized according to a direction of a light receiving element of which the light amount is changed, price competitiveness for gesture recognition can be increased, and the device can be miniaturized so as to be arranged in a mobile terminal.

BEST MODE

The detailed description set forth below in connection with the appended drawings is intended as a description of exemplary aspects of the invention and is not intended to represent the only exemplary aspects in which the invention can be practiced. Thus, the invention described herein is intended to embrace all such alternatives, modifications, variations and applications as may fall within the spirit and scope of the appended claims.

Now, the present invention will be described in detail with reference to the accompanying drawings.

Figure 1A:
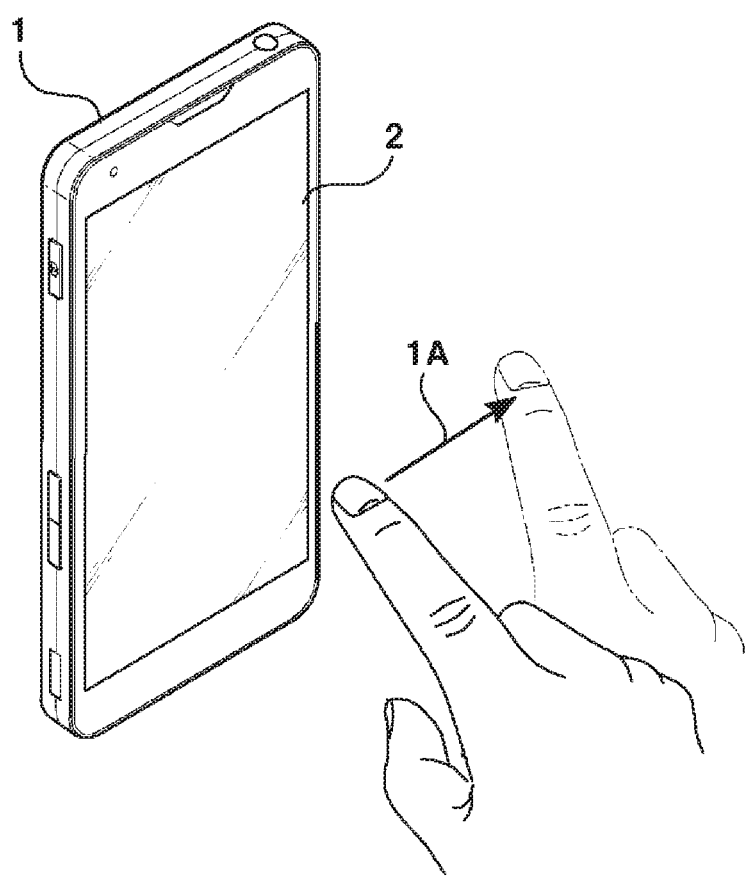
FIGS 1A and 1B are exemplary views to explain a concept in which a gesture recognition device according to an exemplary embodiment of the present invention is applied to a mobile terminal
Figure 1B:
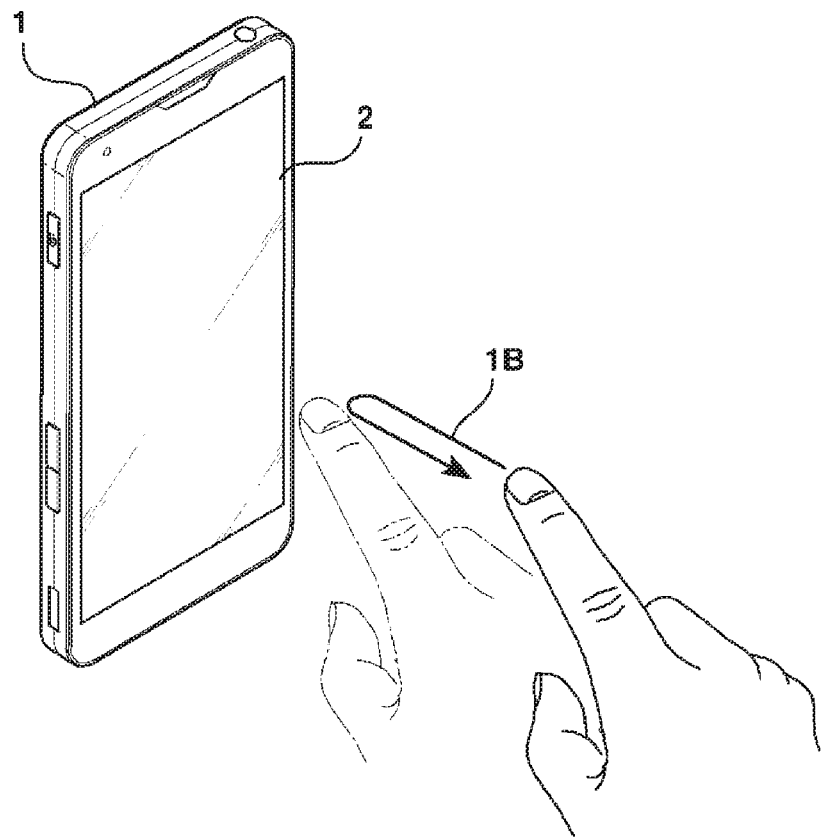

FIGS. 1A and 1B are exemplary views to explain a concept in which a gesture recognition device according to an exemplary embodiment of the present invention is applied to a mobile terminal.

Referring to FIG. 1A, when a user of a mobile terminal (1) gestures (flicking 1A) at a proximate position of a front surface of the mobile terminal (1) to move to one of left and right direction, the gesture recognition device according to an exemplary embodiment of the present invention may recognize the gesture by ascertaining the gesture.

Furthermore, referring to FIG. 1B, when a user of a mobile terminal (1) performs a gesture (1B), at a proximate position of a front surface of the mobile terminal (1), of returning to an original position after staying at a predetermined time while approaching a nearer position, the gesture recognition device according to an exemplary embodiment of the present invention may recognize the gesture by ascertaining the gesture. In this case, the gesture recognition device can ascertain a 3D input.

As discussed above, an input device according to an exemplary embodiment of the present invention is configured such that a user can recognize an input gesture using a simple configuration. However, although explanation was given a case where an input device according to an exemplary embodiment of the present invention is applied to a mobile phone in order to explain the exemplary embodiment of the present invention, the present invention is not limited thereto, and may be applied to various types of mobile terminals that receive a gesture input of a user. That is, various devices may be included that are capable of recognizing a gesture at a proximate position such as, for example, notebook computers, digital broadcasting terminals, PDAs (Personal Digital Assistants), PMPs (Portable Multimedia Players) and navigations.

Figure 2:
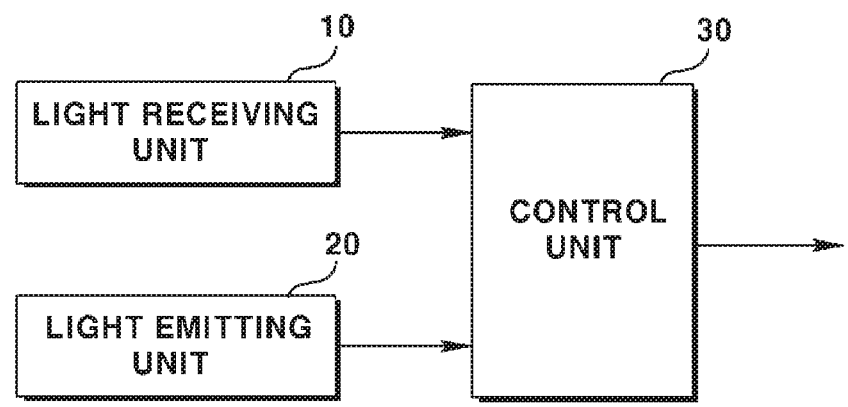
FIG. 2 is a schematic block diagram illustrating an input device according to an exemplary embodiment of the present invention.

FIG. 2 is a schematic block diagram illustrating an input device according to an exemplary embodiment of the present invention.

Referring to FIG. 2, an input device according to an exemplary embodiment of the present invention may be provided to a front surface of a mobile terminal (1) as shown in FIG. 1 to recognize a gesture provided by a user from a front surface of a display (2) of the mobile terminal (1), and may include a light receiving unit (10), a light emitting unit (20) and a control unit (30).

The light receiving unit (10) may be arranged with a plurality of light receiving elements to enable definition of plane and depth directions. The plurality of light receiving elements is an element configured to convert light to electricity, and may include PDs (Photo Diodes), APDs (Avalanche Photo Diodes) and the like. However, the present invention is not limited thereto, and a various types of light receiving elements may be arranged.

Figure 3A:
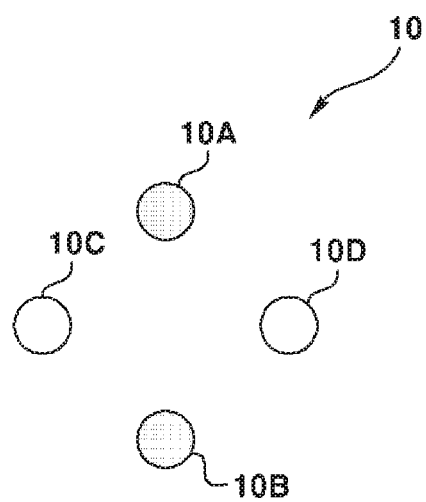
FIGS. 3A and 3B are exemplary views illustrating arrangement of light receiving elements for 2D gesture recognition.
Figure 3B:
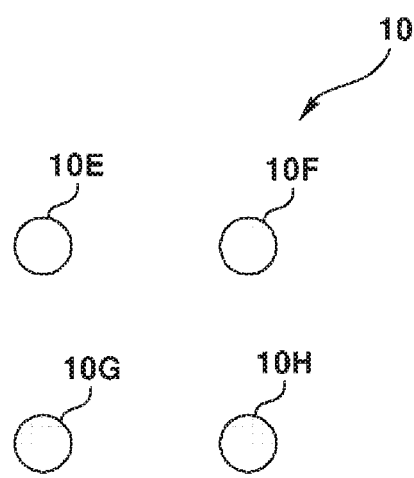
Figure 4A:
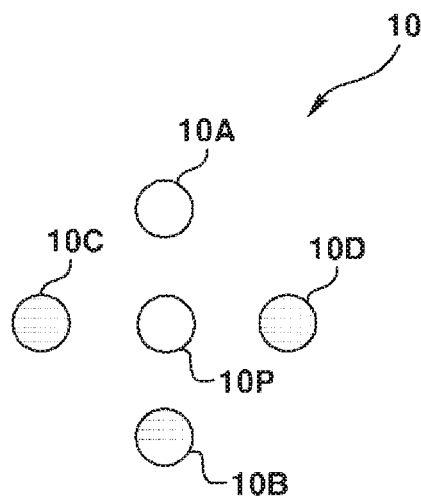
FIGS. 4A and 4B are exemplary views illustrating arrangement of light receiving elements for 3D gesture recognition.
Figure 4B:
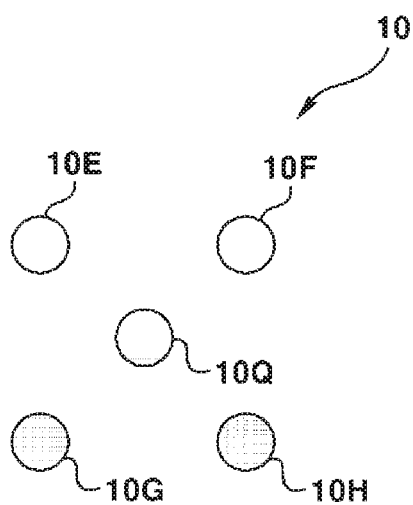

FIGS. 3A and 3B are exemplary views illustrating arrangement of light receiving elements for 2D gesture recognition, and FIGS. 4A and 4B are exemplary views illustrating arrangement of light receiving elements for 3D gesture recognition.

Referring to FIG. 3A, first and second light receiving elements (10A, 10B) are to recognize Y axis, and third and fourth light receiving elements (10C, 10D) are to recognize X axis. However, these are simply for exemplary purpose, and definition on directions are not limited thereto.

When the light receiving elements are arranged as shown in FIG. 3A, and when a user inputs a flicking gesture as in FIG. 1A, the third and fourth light receiving elements (10C, 10D) may sequentially sense changes in light amount (i.e., the third light receiving element 10C is first darkened and brightened, and then, the fourth light receiving element 10D is darkened and brightened), and then, the control unit (30) may determine that the input of flicking gesture has been received from left side of X axis to right side.

At this time, although the first and second light receiving elements (10A, 10B) may also sense the changes in light amount, the control unit (30) may ascertain that the input of flicking gesture has received from left side of X axis to the right side, because the light amount has changed, starting from the third light receiving element (10C) to the direction of the fourth light receiving element (10D). Likewise, even if there is an input from upward of Y axis direction to downward, or from downward to upward direction, the control unit (30) may determine a relevant gesture in response to changes in light amount of the light receiving elements.

Now, referring to FIG. 3B, the control unit (30) may ascertain a gesture of X direction by using changes in light amount of fifth and sixth light receiving elements (10E, 10F) or seventh and eighth light receiving elements (10G, 10H), and the control unit (30) may ascertain a gesture of Y direction by using changes in light amount of fifth and seventh light receiving elements (10E, 10G) or sixth and eighth light receiving elements (10F, 10H).

Meantime, when the light receiving elements are arranged as shown in FIG. 3B, the control unit (30) may ascertain a gesture of diagonal direction by using changes in light amount of fifth and eighth light receiving elements (10E, 10H) or sixth and seventh light receiving elements (10F, 10G).

As noted above, the control unit (30) can determine a direction of a gesture input provided by a user through changes in light amount of the plurality of light receiving elements arranged at a predetermined pattern, whereby recognition of various gestures such as flicking gesture and scroll gesture can be recognized.

A control unit (not shown) of a mobile terminal (1) may perform various functions (e.g., page movement, page scroll, etc.) paralleling gestures through the gesture recognition.

The arrangement of light receiving elements of FIGS. 4A and 4B is for 3D gesture recognition. FIGS. 4A and 4B illustrate an arrangement of ninth light receiving element (10P) and tenth light receiving element (10Q) respectively in addition to that of FIGS. 3A and 3B. Explanation of first to fourth light receiving elements (10A-10D) in FIG. 4a and fifth to eighth light receiving elements (10E-10H) of FIG. 4b are same as discussed above, such that no further elaboration will be made thereto.

The ninth and tenth light receiving elements (10P, 10Q) are respectively for determining depth information, where the control unit (30) may determine that a gesture of Z axis direction has been received when light amount is changed after a standard light amount of light receiving element is maintained for a predetermined time.

That is, in an example as illustrated in FIG. 1b, the ninth light receiving element (10P) of FIG. 4A may sense that the light amount is darkened for a predetermined time and brightened again, when a user's hand approaches to stay for a predetermined time and return to an original position (1B), whereby the control unit (30) can sense the gesture of 1B in response to the changes in the light amount.

Although the exemplary embodiment of the present invention has explained that the Z direction is determined by a separate light receiving element, it should be apparent that the present invention does not rule out that one of first to fourth elements (10A to 10D) or fifth to eighth light receiving elements (10E to 10H) can perform this function.

A control unit (not shown) of the mobile terminal (1) can recognize the depth of gesture by the recognition of gesture thus discussed. As a result, the control unit can perform various functions corresponding to various gestures including proximate touch gesture.

Meantime, the light emitting unit (20) of FIG. 2 may be arranged at a periphery of the light receiving unit (10) to better recognize the changes in light amount of the control unit (30), For example, the light emitting unit (20) may be an LED (Light Emitting Diode) or an LD (Light Diode), but the present invention is not limited thereto, and various other light emitting diodes may be used.

The light receiving elements of the light receiving unit (10) may be arranged at a rear surface of a display (2) of the mobile terminal (1). Furthermore, it should be noted that the arrangement of light receiving elements of the light receiving unit (10) is not limited to what is proposed in FIGS. 3A, 3B, 4A and 4B, and may be arranged in various methods. Furthermore, it should be apparent that more number of light receiving elements can be arranged in order to further promote the recognition rate.

As discussed above, the exemplary embodiments of the present invention can recognize the gesture in response to direction of light receiving elements that changes in terms of light amount.

Although embodiments have been described with reference to a number of illustrative embodiments thereof, it should be understood that numerous other modifications and embodiments can be devised by those skilled in the art that will fall within the spirit and scope of the principles of this invention.

The invention claimed is:

1. A gesture recognition device, the gesture recognition device comprising:
   a light receiving unit comprising a plurality of light receiving elements; and
   a control unit configured to determine a direction of a change in an amount of light that is sensed by the plurality of light receiving elements, wherein the change is triggered by a gesture of a user;
   wherein the plurality of light receiving elements comprises a first light receiving element, a second light receiving element disposed in an extension from the first light receiving element in a X-axis direction, a third light receiving element disposed in an extension from the first light receiving element in a Y-axis direction perpendicular to the X-axis direction, a fourth light receiving element disposed in an extension from the second light receiving element in the Y-axis direction, and a fifth light receiving element disposed at an intersection formed by a first imaginary line connecting the first light receiving element and the fourth light receiving element and a second imaginary line connecting the second light receiving element and the third light receiving element;
   wherein the control unit determines that a gesture input is applied in the X-axis direction when the first light receiving element and the second light receiving element sense a change in amount of a received light or when the third light receiving element and the fourth light receiving element sense a change in amount of the received light,
   wherein the control unit determines that a gesture input is applied in the Y-axis direction when the first light receiving element and the third light receiving element sense a change in amount of the received light or when the second light receiving element and the fourth light receiving element sense a change in amount of the received light, and
   wherein the control unit determines that a gesture input is applied in a Z-axis direction when the fifth light receiving element senses a change in amount of the received light after the received light amount is maintained for a predetermined time period.

2. The gesture recognition device of claim 1, wherein the third light receiving element is disposed in an extension from the fourth light receiving element in the X-axis direction.

3. The gesture recognition device of claim 2, wherein the control unit determines that a gesture input is applied in the X-axis direction when determining from the first and second light receiving elements that there is a change in the received light amount.

4. The gesture recognition device of claim 2, wherein the control unit determines that a gesture input is applied in the X-axis direction when determining from the third and fourth light receiving elements that there is a change in the received light amount.

5. The gesture recognition device of claim 1, wherein the control unit determines that a gesture input is applied in the Z axis direction when determining from the fifth light receiving element that the received light amount is changed after maintaining for a predetermined time period.

6. The gesture recognition device of claim 1, further comprising a light emitting unit disposed at a periphery of the light receiving unit to output a light.

7. The gesture recognition device of claim 1,
   wherein the first to fourth light receiving elements are disposed in a grid pattern.

8. The gesture recognition device of claim 1, wherein a distance between the first light receiving element and the second light receiving element is same as a distance between the first light receiving element and the third light receiving element.

9. The gesture recognition device of claim 1, wherein a distance between the first light receiving element and the fifth light receiving element is same as a distance between the second light receiving element and the fifth light receiving element.

10. The gesture recognition device of claim 1, wherein a distance between the first light receiving element and the fifth light receiving element is same as a distance between the third light receiving element and the fifth light receiving element.

11. The gesture recognition device of claim 1, wherein the control unit recognizes a gesture in a diagonal direction based on changes in the received light amount of the first light receiving element and the fifth light receiving element.

12. The gesture recognition device of claim 1, wherein the control unit performs a page movement or a page scroll when the control unit determines that a gesture input is applied.

13. The gesture recognition device of claim 1, wherein the plurality of light receiving elements comprises at least one of PDs (Photo Diodes) and APDs (Avalanche Photo Diodes).

14. The gesture recognition device of claim 6, wherein the light emitting unit comprises a LED (Light Emitting Diode) or a LD (Light Diode).

15. A mobile terminal, the mobile terminal comprising:
   a display; and
   the gesture recognition device of claim 1,
   wherein the light receiving unit is disposed at a rear surface of the display.

* * * * *